US011348077B2

(12) United States Patent
Naik et al.

(10) Patent No.: US 11,348,077 B2
(45) Date of Patent: May 31, 2022

(54) SYSTEMS AND METHODS FOR PRE-STAGING ATM TRANSACTIONS

(71) Applicant: CITIBANK, N.A., New York, NY (US)

(72) Inventors: Jayant M. Naik, Mason, OH (US); Giridhar Narayanan, Flower Mound, TX (US); Matthew John Yuschik, Cincinnati, OH (US); Ajay Warrier, Mason, OH (US); Jiachun Zhang, Mason, OH (US)

(73) Assignee: CITIBANK, N.A., New York, NY (US)

( * ) Notice: Subject to any disclaimer, the term of this patent is extended or adjusted under 35 U.S.C. 154(b) by 317 days.

(21) Appl. No.: 15/375,296

(22) Filed: Dec. 12, 2016

(65) Prior Publication Data

US 2018/0165663 A1    Jun. 14, 2018

(51) Int. Cl.
  *G06Q 20/10*  (2012.01)
  *G06Q 20/38*  (2012.01)
  *G06Q 20/32*  (2012.01)

(52) U.S. Cl.
  CPC ..... *G06Q 20/1085* (2013.01); *G06Q 20/3223* (2013.01); *G06Q 20/3821* (2013.01)

(58) Field of Classification Search
  CPC .............. G06Q 20/1085; G06Q 20/16; G06Q 20/3223; G06Q 20/3821
  See application file for complete search history.

(56) References Cited

U.S. PATENT DOCUMENTS

| 4,660,168 A | 4/1987 | Grant et al. |
| 8,065,226 B2 | 11/2011 | Rizzo et al. |

(Continued)

FOREIGN PATENT DOCUMENTS

| WO | 2011063432 A2 | 5/2011 |
| WO | 2013119914 A1 | 8/2013 |

(Continued)

OTHER PUBLICATIONS

"Muhammad-Bello B.L., An Enhanced ATM Security System using Second Level Authentication, 2015, International Journal of Computer Application, 12-14" (Year: 2015).*

(Continued)

*Primary Examiner* — Christopher Bridges
*Assistant Examiner* — Toan Duc Bui
(74) *Attorney, Agent, or Firm* — Johnson, Marcou, Isaacs & Nix, LLC; George Marcou; Scott A. Hendrix

(57) ABSTRACT

Methods and systems for performing a pre-staged transaction, such as a cash withdrawal by a user or a user's surrogate, employ a host server that receives pre-staged ATM transaction data via a first communication channel from a user's mobile device and sends a first unique authentication token via a second communication channel to the user's mobile device processor. An ATM processor receives entry of a pre-staged ATM transaction request and the first unique authentication token and sends the entered pre-staged ATM transaction request and first unique authentication token to the host server for validation, which validates the received pre-staged ATM transaction input data and the entered first unique authentication token.

13 Claims, 11 Drawing Sheets

(56) References Cited

U.S. PATENT DOCUMENTS

| | | | |
|---|---|---|---|
| 8,768,838 B1* | 7/2014 | Hoffman | G06Q 40/00 |
| | | | 705/44 |
| 8,881,977 B1* | 11/2014 | Paczkowski | G06Q 20/322 |
| | | | 235/379 |
| 8,972,297 B2 | 3/2015 | Kay | |
| 9,141,956 B2 | 9/2015 | Black et al. | |
| 9,418,358 B2 | 8/2016 | Mande et al. | |
| 9,721,248 B2* | 8/2017 | Bondesen | G06Q 20/36 |
| 9,922,370 B2* | 3/2018 | Kobres | G06Q 40/02 |
| 10,027,667 B2* | 7/2018 | Straub | H04L 63/0876 |
| 10,475,036 B2* | 11/2019 | Kumar | H04L 63/083 |
| 2007/0265984 A1 | 11/2007 | Santhana et al. | |
| 2008/0040273 A1 | 2/2008 | Savage et al. | |
| 2012/0197797 A1 | 8/2012 | Grigg et al. | |
| 2013/0226794 A1 | 8/2013 | Englebardt et al. | |
| 2013/0238488 A1* | 9/2013 | Bouey | G06Q 20/405 |
| | | | 705/39 |
| 2014/0172703 A1 | 6/2014 | Black et al. | |
| 2014/0324689 A1 | 10/2014 | Pinault et al. | |
| 2015/0287017 A1* | 10/2015 | Iqbal | G06Q 20/3224 |
| | | | 705/44 |
| 2016/0104155 A1* | 4/2016 | McGaugh | G06Q 20/20 |
| | | | 705/65 |
| 2016/0285633 A1* | 9/2016 | Allinson | G06F 21/34 |
| 2017/0132593 A1* | 5/2017 | Block | G06Q 20/40145 |
| 2017/0308883 A1* | 10/2017 | Black | G06Q 20/206 |

FOREIGN PATENT DOCUMENTS

| | | | | |
|---|---|---|---|---|
| WO | | 2016100965 A1 | 6/2016 | |
| WO | WO-2016100965 A1 * | | 6/2016 | G06Q 20/363 |

OTHER PUBLICATIONS

International Search Report for PCT International Application No. PCT/US12/69640, dated Jan. 4, 2013, 11.

International Search Report and Written Opinion for PCT International Application No. PCT/US2017/059045, dated Jan. 16, 2018, 11.

* cited by examiner

4001

THE USER'S ENTRY OF INFORMATION FOR A PRE-STAGED USER'S ATM WITHDRAWAL, TOGETHER WITH THE USER'S ID AND PASSWORD, MAY BE RECEIVED BY THE USER'S REGISTERED MOBILE DEVICE PROCESSOR AND SENT BY THE USER'S MOBILE DEVICE PROCESSOR VIA A SECURE GATEWAY TO THE HOST OR BACKEND SERVER PROCESSOR

4002

RESPONSIVE TO RECEIVING THE INFORMATION FOR THE PRE-STAGED USER'S ATM WITHDRAWAL, TOGETHER WITH THE USER'S ID AND PASSWORD, THE HOST OR BACKEND SERVER PROCESSOR MAY VALIDATE THE WITHDRAWAL INFORMATION AND THE USER'S ID AND PASSWORD AND GENERATE AND SEND AN AUTHENTICATION TOKEN TO THE USER'S MOBILE DEVICE PROCESSOR, FOR EXAMPLE, VIA THE SECURE GATEWAY, WHICH MAY BE DISPLAYED ON THE USER'S DEVICE SCREEN FOR THE USER. ALTERNATIVELY, THE HOST OR BACKEND PROCESSOR MAY SEND AN OUT-OF-BAND AUTHENTICATION TOKEN FOR THE USER TO THE USER'S REGISTERED MOBILE DEVICE

4003

THE USER MAY APPROACH AN ATM AND SELECT AN OPTION FOR A PRE-STAGED CASH WITHDRAWAL DISPLAYED ON THE ATM. ALTERNATIVELY, THE USER MAY SCAN OR TAP THE USER'S NFC-ENABLED REGISTERED MOBILE DEVICE ON AN NFC CARD READER PANEL OR SENSOR OF AN ATM, AND THE NFC CARD READER MAY INTERFACE WITH THE NFC CHIP ON THE USER'S MOBILE DEVICE

4004

IN RESPONSE TO RECEIVING THE USER'S SELECTION OF AN OPTION FOR A PRE-STAGED CASH WITHDRAWAL, OR ALTERNATIVELY IN RESPONSE TO INTERFACING WITH THE NFC CHIP ON THE USER'S MOBILE DEVICE, THE PROCESSOR OF THE ATM MAY PROMPT THE USER FOR ENTRY OF THE USER'S PIN AND THE USER'S AUTHENTICATION TOKEN ON THE ATM DISPLAY SCREEN

CONTINUED FROM 4004 IN FIG. 4A

4005
RESPONSIVE TO RECEIVING ENTRY OF THE USER'S PIN AND THE USER'S AUTHENTICATION TOKEN, THE PROCESSOR OF THE ATM MAY SEND THE PRE-STAGED USER'S ATM WITHDRAWAL REQUEST, TOGETHER WITH THE USER'S PIN AND THE USER'S AUTHENTICATION TOKEN TO THE HOST OR BACK-END SERVER PROCESSOR

4006
UPON VALIDATING THE USER'S PIN AND AUTHETICATION TOKEN, THE HOST OR BACKEND SERVER PROCESSOR MAY DEBIT THE USER'S DESIGNATED ACCOUNT FOR THE AMOUNT OF CASH REQUESTED TO BE WITHDRAWN, AND AN AUTHORIZATION MESSAGE MAY BE SENT TO THE ATM

4007
UPON RECEIVING THE AUTHORIZATION MESSAGE, THE REQUESTED AMOUNT OF CASH MAY BE DISPENSED BY THE ATM PROCESSOR FOR THE USER

THE USER'S ENTRY OF INFORMATION FOR A PRE-STAGED USER'S SURROGATE ATM WITHDRAWAL, TOGETHER WITH THE USER'S ID AND PASSWORD, MAY BE RECEIVED BY THE USER'S MOBILE DEVICE PROCESSOR AND SENT BY THE USER'S MOBILE DEVICE PROCESSOR VIA THE SECURE GATEWAY TO THE HOST OR BACKEND SERVER PROCESSOR

5002

RESPONSIVE TO RECEIVING THE INFORMATION FOR THE PRE-STAGED USER'S SURROGATE ATM WITHDRAWAL, TOGETHER WITH THE USER'S ID AND PASSWORD, THE HOST OR BACKEND SERVER PROCESSOR MAY VALIDATE THE WITHDRAWAL INFORMATION AND THE USER'S ID AND PASSWORD AND GENERATE AND SEND AUTHENTICATION TOKENS FOR THE USER AND THE USER'S SURROGATE TO THE USER'S MOBILE DEVICE VIA THE SECURE GATEWAY, WHICH MAY BE DISPLAYED ON THE USER'S DEVICE SCREEN FOR THE USER. ALTERNATIVELY, THE AUTHENTICATION TOKENS MAY BE SENT OUT-OF-BAND TO THE USER'S REGISTERED MOBILE DEVICE AS AN EMAIL OR SMS MESSAGE VIA AN ALERTS PLATFORM, WHICH MAY BE DISPLAYED ON THE USER'S REGISTERED MOBILE DEVICE SCREEN FOR THE USER

CONTINUED FROM 5002 IN FIG. 5A

5003
THE USER MAY NOTIFY THE USER'S SURROGATE OF THE PRE-STAGED USER'S SURROGATE ATM WITHDRAWAL AND THE AUTHENTICATION TOKEN FOR THE USER'S SURROGATE

5004
RESPONSIVE TO ENTRY BY THE USER'S SURROGATE OF THE SURROGATE'S AUTHENTICATION TOKEN AT AN ATM, THE PROCESSOR OF THE ATM MAY SEND THE SURROGATE'S AUTHENTICATION TOKEN VIA THE ATM NETWORK TO THE HOST OR BACK-END SERVER PROCESSOR.

5005
UPON VALIDATING THE SURROGATE'S AUTHENTICATION TOKEN, THE HOST OR BACKEND PROCESSOR MAY GENERATE AND SEND A REQUEST FOR CONFIRMATION, FOR EXAMPLE, VIA THE ALERTS PLATFORM AS AN EMAIL, SMS, OR VOICEMAIL MESSAGE TO THE USER'S MOBILE DEVICE PROCESSOR, WHICH MAY BE DISPLAYED ON THE USER'S DEVICE SCREEN FOR THE USER

CONTINUED FROM 5005 IN FIG. 5B

5006

RESPONSIVE TO RECEIVING ENTRY OF THE USER'S AUTHENTICATION TOKEN AND CONFIRMATION, THE USER'S REGISTERED MOBILE DEVICE PROCESSOR MAY SEND THE USER'S AUTHENTICATION TOKEN AND CONFIRMATION TO THE HOST OR BACKEND SERVER PROCESSOR, WHICH MAY RETRIEVE THE PREVIOUSLY RECEIVED AND VALIDATED PRE-STAGED USER'S SURROGATE ATM WITHDRAWAL INFORMATION, THE USER'S ACCOUNT MAY BE DEBITED FOR THE AMOUNT OF CASH REQUESTED TO BE WITHDRAWN BY THE SURROGATE, AND AN AUTHORIZATION MESSAGE MAY BE SENT TO THE ATM

5007

UPON RECEIVING THE AUTHORIZATION MESSAGE BY THE PROCESSOR OF THE ATM, THE REQUESTED AMOUNT OF CASH MAY BE DISPENSED BY THE ATM PROCESSOR TO THE SURROGATE

FIG. 5C

SYSTEMS AND METHODS FOR PRE-STAGING ATM TRANSACTIONS

FIELD OF THE INVENTION

The present invention relates generally to the field of automated teller machines, and more particularly to methods and systems for pre-staging transactions before interaction with automated teller machines (ATMs) using any mobile device, such as a smart phone.

BACKGROUND OF THE INVENTION

While there have been few major innovations in ATM technology in recent years, on-demand digital experiences such as on-line shopping and transportation services have conditioned consumers to expect seamless, intuitive technology experiences, such as cardless-solutions-aided mobile innovations. Today's consumers often need cash without the requirement of having a card present. For example, when consumers experience a lost, stolen, or breached card, they may need a solution that allows them to access funds without a card. In addition, there are instances in which consumers simply do not want to carry cards, purses or wallets, such as a night out or a trip to the beach, as a matter of convenience and/or security that cardless solutions may accommodate.

There is a present need for methods and systems that bring together currently available ATM and mobile device channels to provide increased convenience and greater security in performing ATM transactions, such as cash withdrawals, for example, by enabling a user to pre-stage an ATM withdrawal on the user's mobile device to be executed at an ATM by the user or by a surrogate of the user. The problem that is solved by embodiments of the invention is rooted in technological limitations of legacy approaches, and improved techniques and, in particular, improved applications of technology are needed to address the problems of currently employed mechanisms. More specifically, the technologies applied in the aforementioned legacy approaches fail to achieve the sought-after capabilities of the herein-disclosed techniques for pre-staging transactions with an ATM using a mobile device.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

SUMMARY OF THE INVENTION

Embodiments of the invention advance the technical fields for addressing problems associated with the above described currently employed mechanisms for performing transactions with an ATM, as well as advancing peripheral technical fields. Such embodiments are directed to technological solutions that may involve systems that include, for example, a host server processor communicably coupled to an ATM network and programmed to receive pre-staged ATM transaction data via a first communication channel from a user's mobile communication device processor and to send a first unique authentication token via a second communication channel to the user's mobile communication device processor. It is to be understood that all references to "communication channel" herein shall be deemed to include any suitable media through which a message may be transmitted to its intended recipient.

Such systems for embodiments of the invention may also include, for example, an ATM processor communicably coupled to the ATM network and programmed to receive entry of a pre-staged ATM transaction request and the first unique authentication token and to send the entered pre-staged ATM transaction request and first unique authentication token to the host server for validation. In such systems for embodiments of the invention, the host server processor may be further programmed, for example, to validate the pre-staged ATM transaction request based at least in part on the received pre-staged ATM transaction data and the entered first unique authentication token.

In embodiments of the invention, the host server processor may be further programmed, for example, to receive the pre-staged ATM transaction data for a user surrogate via the first communication channel from the user's mobile communication device processor. The host server processor may be further programmed, for example, to send a second unique authentication token with the first unique authentication token via the second communication channel to the user's mobile communication device processor. It is to be understood that all references herein to "second unique authentication token" or "second authentication token" shall be deemed to include any second and/or additional active and/or passive authentication mechanism or mechanisms.

In other embodiments of the invention, the ATM processor may be further programmed to receive entry by the user surrogate of the pre-staged ATM transaction request and the first unique authentication token and to send the entered pre-staged ATM transaction request and said first unique authentication token to the host processor for validation. In such embodiments, the host server processor may be further programmed, for example, to associate said first unique authentication token with the pre-staged ATM transaction data for the user surrogate and send a confirmation request via the second communication channel to the user's mobile communication device processor In additional embodiments of the invention, the host processor may be further programmed, for example, to receive a confirmation message and the second unique authentication token via the second communication channel from the user's mobile communication device processor and to send an authorization message to the ATM, responsive to receiving the confirmation message.

In still other embodiments of the invention, the host server processor may be further programmed, for example, to receive the pre-staged ATM transaction data consisting at least in part of a withdrawal amount and account and a user ID and password via the first communication channel from the user's mobile communication device processor. In additional embodiments, the host server processor may be further programmed, for example, to receive the pre-staged ATM transaction data consisting at least in part of a withdrawal location via the first communication channel from the user's mobile communication device processor.

In other embodiments of the invention, the host server processor may be further programmed, for example, to receive the pre-staged ATM transaction data via the first communication channel comprising a secure gateway from the user's mobile communication device processor. In additional embodiments, the host server processor may be further programmed, for example, to send the first unique authentication token via the second communication channel comprising an SMS, email, voicemail, or push notification channel or other communication channel to the user's mobile communication device processor. In still other embodiments, the host server processor may be further programmed, for example, to send the second unique authentication token with the first unique authentication token via the second communication channel comprising an SMS, email, voicemail, or push notification channel to the user's mobile communication device processor.

In other embodiments of the invention, the ATM processor may be further programmed, for example, to receive entry of the pre-staged ATM transaction request via a contactless interface with the mobile communication device processor and the first unique authentication token via entry on a touch screen interface of the ATM processor. In still other embodiments, the ATM processor may be further programmed, for example, to receive the pre-staged ATM transaction request and the first unique authentication token within a user-defined time-out period.

Embodiments of the invention employ computer hardware and software, including, without limitation, one or more processors coupled to memory and non-transitory computer-readable storage media with one or more executable programs stored thereon which instruct the processors to perform methods involving, for example, receiving, by a host server processor communicably coupled to an ATM network, pre-staged ATM transaction data via a first communication channel from a user's mobile communication device processor; sending, by the host server processor, a first unique authentication token via a second communication channel to the user's mobile communication device processor; receiving, by an ATM processor communicably coupled to the ATM network, entry of a pre-staged ATM transaction request and the first unique authentication token; sending, by the ATM processor, the entered pre-staged ATM transaction request and first unique authentication token to the host server for validation; and validating, by the host server processor, the entered pre-staged ATM transaction request based at least in part on the received pre-staged ATM transaction data and the entered first unique authentication token.

In embodiments of the invention, receiving the pre-staged ATM transaction data via the first communication channel from the user's mobile communication device processor may involve, for example, receiving, by the host server processor, pre-staged ATM transaction data for a user surrogate via the first communication channel from the user's mobile communication device processor and sending a second unique authentication token with the first unique authentication token via the second communication channel to the user's mobile communication device processor. Other embodiments may involve, for example, receiving, by the ATM processor communicably coupled to the ATM network, entry by the user surrogate of the pre-staged transaction request and the first unique authentication token and sending the entered pre-staged transaction request and said first unique authentication token to the host processor for validation.

Additional embodiments of the invention may involve, for example, associating, by the host processor, said first unique authentication token with the pre-staged ATM transaction data for the user surrogate and sending a confirmation request via the second communication channel to the user's mobile communication device processor. Further embodiments may involve, for example, receiving, by the host processor, a confirmation message and the second unique authentication token via the second communication channel from the user's mobile communication device processor and sending an authorization message to the ATM responsive to receiving the confirmation message.

In other embodiments of the invention, receiving the pre-staged ATM transaction data via the first communication channel from the user's mobile communication device processor may involve, for example, receiving, by the host server processor, the pre-staged ATM transaction data consisting at least in part of a withdrawal amount and account and a user ID and password via the first communication channel from the user's mobile communication device processor. In still other embodiments, receiving the pre-staged ATM transaction data via the first communication channel from the user's mobile communication device processor may involve, for example, receiving, by the host server processor, the pre-staged ATM transaction data consisting at least in part of a withdrawal location via the first communication channel from the user's mobile communication device processor.

In additional embodiments of the invention, receiving the pre-staged ATM transaction data via the first communication channel from the user's mobile communication device processor may involve, for example, receiving, by the host server processor, the pre-staged ATM transaction data via the first communication channel comprising a secure gateway from the user's mobile communication device processor. In further embodiments, sending the first unique authentication token via the second communication channel to the user's mobile communication device processor may involve, for example, sending, by the host server processor, the first unique authentication token via a second communication channel comprising an SMS, email, voicemail, or push notification channel to the user's mobile communication device processor.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIGS. 4A and 4B show a flow chart that illustrates an example of a process of performing a pre-staged user ATM transaction for embodiments of the invention;

FIGS. 5A, 5B, and 5C show a flow chart that illustrates an example of a process of performing a pre-staged ATM transaction by a user's surrogate for embodiments of the invention;

DETAILED DESCRIPTION

Figure 1A:
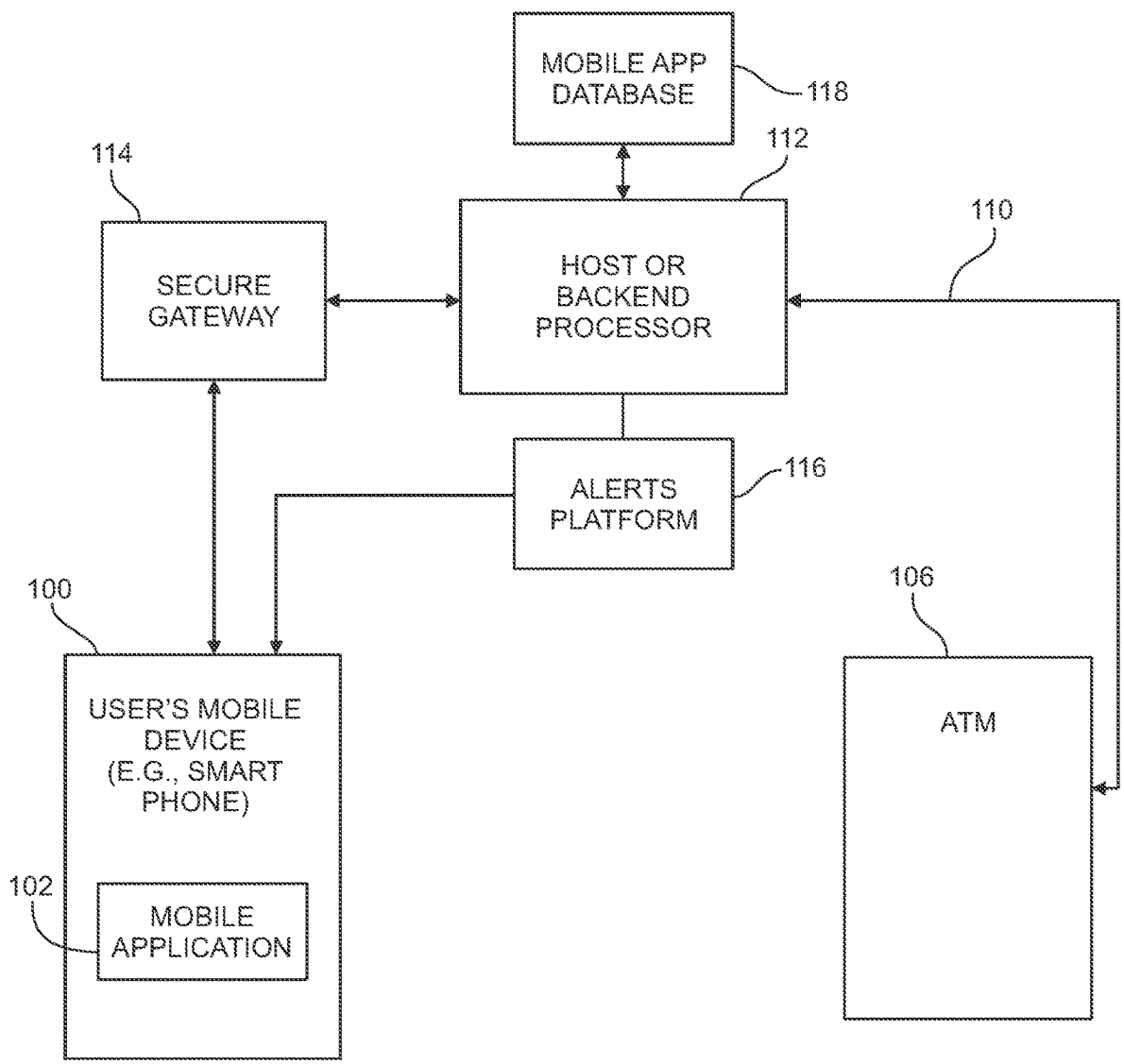
FIG. 1A is a schematic diagram that illustrates an overview of an example of components and the flow of information between components for embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention may utilize, for example, a mobile application on a processor of a mobile device, such as a smart phone, for pre-staging a transaction, such as an ATM cash withdrawal, including without limitation a contactless ATM cash withdrawal, by a user or by a surrogate designated by the user to withdraw cash at an ATM. Thus, embodiments of the invention may enable users to set up withdrawal amounts for themselves or their surrogates using the mobile application on the processor of the mobile communication device. Such pre-staged cash withdrawals are simple, intuitive, and secure. It is to be noted that embodiments of the invention do not require additional hardware to be installed on the ATM.

In embodiments of the invention, the withdrawal of money may be pre-staged for an ATM and may reduce the amount of effort associated with ATM cash withdrawals that typically involve swiping of the ATM card, choosing an account and selecting one or more withdrawal amounts. A pre-staged ATM withdrawal for embodiments of the invention may be performed, for example, by a user entering or scanning in an authentication token at the ATM followed by entering the user's PIN. Thus, a user may have minimal interaction with the ATM that is limited, for example, to obtaining the physical cash.

In alternative embodiments, the pre-staged ATM withdrawal may involve a mobile device processor running the mobile application, for example, in contactless communication with the ATM. Such alternative embodiments may utilize currently available NFC capabilities of a user's mobile device to provide an interface between the user's mobile device and an NFC-enabled ATM, which may allow direct two-way communication between the mobile device processor and the ATM processor. Using such direct NFC communication between the user's mobile device and the ATM, an ATM cash withdrawal may be performed conveniently, securely and privately any time the user's NFC-enabled mobile device is pre-staged is in proximity to an NFC-enabled ATM.

In embodiments of the invention, the ATM screen may display a prompt for the user for entry of a selection of an option for a pre-staged ATM withdrawal. In response to the user's selection of the pre-staged ATM withdrawal option, the ATM screen display may prompt the user for entry of the user's authentication token and PIN. In the aforementioned alternative embodiments, an NFC reader of the NFC-enabled ATM may receive data transmitted from the user's NFC-enabled mobile device when the user approaches the ATM and waves or taps the mobile device on or near the NFC reader of the ATM.

Security features for embodiments of the invention may allow the user to impose controls on pre-staged ATM withdrawals, such as limiting pre-staged ATM withdrawals to specific accounts designated by the user, setting withdrawal amount limits by the user, and restricting withdrawals to geographic locations specified by the user. For example, the user may limit pre-staged withdrawals to one or more accounts, such as pre-determined debit cards or other banking relationships of the user, or may specify a particular card of the user that may be used for the purpose of pre-staging withdrawal of money. Thus, if the user limits pre-staged withdrawals to one or more accounts of the user, when entry of the user's selection of the pre-staged withdrawal option is received, a list of accounts displayed on the user's mobile device screen for entry of a selection of an account by the user may include only the accounts to which such withdrawals are limited.

Similarly, in embodiments of the invention, a user may apply amount control settings to limit the amount of a pre-staged withdrawal to a pre-defined amount, such as $40. Thus, when the predefined amount setting applied by the user is $40, if the user attempts to pre-stage a withdrawal of more than $40, an error notice may be displayed on the user's mobile device screen reminding the user of the predefined amount setting applied by the user to limit withdrawals to $40. The user may also apply a setting to predetermine a withdrawal time limit for withdrawals, which may be a very short period or a considerably longer period. In the geographic limit aspect of embodiments of the invention, money may only be withdrawn from ATMs that fall within geolocation parameters that may be entered by the user in pre-staging an ATM withdrawal. In such aspect, as an aid to the user or the user's surrogate, a confirmation page may also display a map of the geographic area with locations specified for ATMs that fall within the specified geographic location parameters.

An authentication aspect of embodiments of the invention may involve, for example, sending a secure authentication token to a user's registered mobile device, which must be entered from the user's registered mobile device and validated by a host or backend server of the ATM network in order for a withdrawal to be completed. Further, security during pre-staging and pre-staged withdrawals according to embodiments of the invention may be assured by the use of short-lived tokens, which may expire after a pre-defined time-out period.

Still further, an alert aspect of embodiments of the invention may integrate an alert feature of the host or backend server of the ATM network to proactively notify a user when withdrawals are made. In the alert aspect of embodiments of the invention, each time a user pre-stages a withdrawal of money from an ATM, whether by the user or a user's surrogate, when the money is withdrawn, an alert may displayed on the user's mobile device screen confirming that the withdrawal that was staged for the user-requested amount from the user-designated account occurred at a particular ATM.

In embodiments of the invention, enhanced security may be applied via an out-of-band authentication aspect that may involve, for example, authentication over a network or channel separate from the primary network or channel. For example, a user may apply an out-of-band authentication setting, in which case, the secure authentication token may be validated only from a device that was registered in advance for out-of-band authentication with the host or backend server of the ATM network.

Thus, in embodiments of the invention, when the user registers his or her mobile device for out-of-band authentication, the unique identifier of the user's device, such as the International Mobile Subscriber Identity (IMSI) number of the user's mobile device, may be tracked on the backend. Only that particular registered device may be recognized for out-of band authentication, meaning that the authentication token may be authenticated only when presented to the host or backend server of the ATM network via the particular mobile device that was registered.

Further, in the out-of-band authentication aspect for embodiments of the invention, when the user registers his or her mobile device for out-of-band authentication and attempts a pre-staged withdrawal of money from an ATM, an authentication token may be sent by the host or backend server of the ATM network to the user's registered mobile device via another channel, such as SMS, email, voicemail, or push notification, and must be entered at the ATM and validated in order for the withdrawal to be completed. Likewise, when a surrogate of the user attempts a pre-staged withdrawal of money at an ATM, an authentication token may be sent by the host or backend server of the ATM network to the user's registered mobile device via another channel, such as SMS, email, voicemail, or push notification, and must be entered at an ATM by the surrogate and validated in order for the withdrawal to be completed.

The authentication token for embodiments of the invention may be a transient, single use token which may be supplied to the user by the backend server of the ATM network as soon as the user pre-stages a withdrawal. The token may be valid for only a short pre-determined time-out period, such as fifteen minutes, or the time-out period may be configured by the user for a longer or shorter time-out period. If the authentication token is not entered on an ATM to complete the withdrawal within the time-out period, the withdrawal may be declined. It is to be understood that in pre-staging an ATM withdrawal for a surrogate, the authentication token for the user and an authentication token for the surrogate are both displayed on the user's mobile device screen for the user.

Figure 1B:
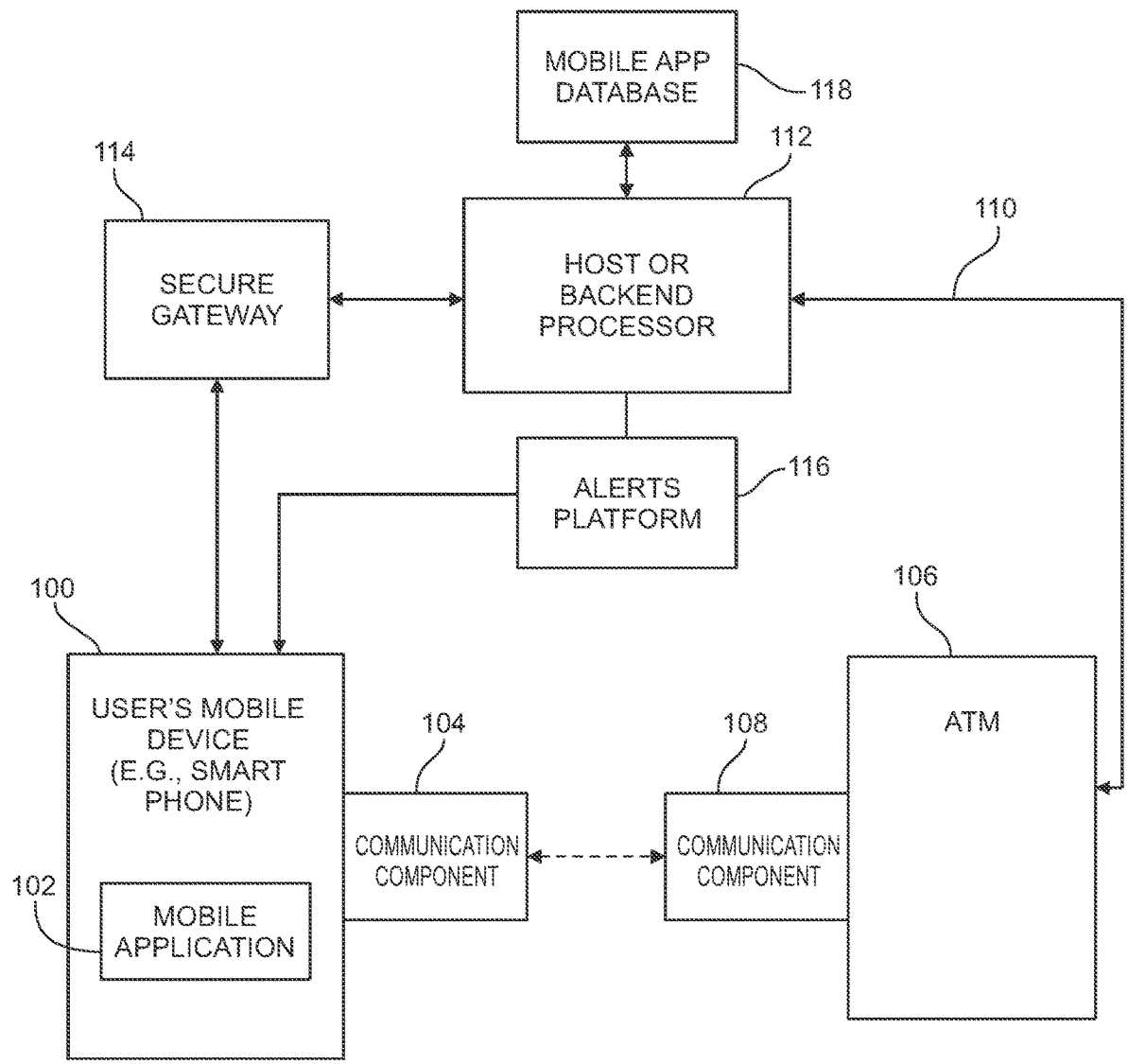
FIG. 1B is a schematic diagram that illustrates an overview of an example of components and the flow of information between components for alternative embodiments of the invention.

FIG. 1A is a schematic diagram that illustrates an overview of an example of components and the flow of information between components for embodiments of the invention; and FIG. 1B is a schematic diagram that illustrates an overview example of components and the flow of information between components for alternative embodiments of the invention.

Referring to FIG. 1A, embodiments of the invention may employ a mobile communication device 100, such as a smart phone with a smart phone processor, on which may be deployed a mobile application 102. Referring further to FIG. 1A, such embodiments may also employ an ATM 106 with an ATM processor, which may be coupled, for example, over an ATM network 110 to a backend or host processor 112 that may be coupled to a mobile application database 118 and which may communicate with the user's mobile device 100 via a first channel 114, such as a secure gateway, or a second channel 116, such as an SMS, email, voicemail, or push notification channel, separate from the first channel 114.

Referring to FIG. 1B, alternative embodiments of the invention may employ components that are essentially the same as those employed in the example illustrated in FIG. 1A. However, in such other embodiments, the mobile communication device 100, such as the user's smart phone, may be equipped with a communication component 104, such as an NFC chip, and the ATM 106 may be equipped with a communication component 108, such as an NFC transceiver. It is to be understood that the foregoing references to NFC components are exemplary only, and that embodiments of the invention may employ any other suitable communication components, either as integrated or peripheral communication components, for communicating data contactlessly and/or wirelessly over relatively short distances, such as a few inches or less up to a few feet or more, or by simply tapping the mobile device 100 to an area of the ATM 106.

Figure 2:
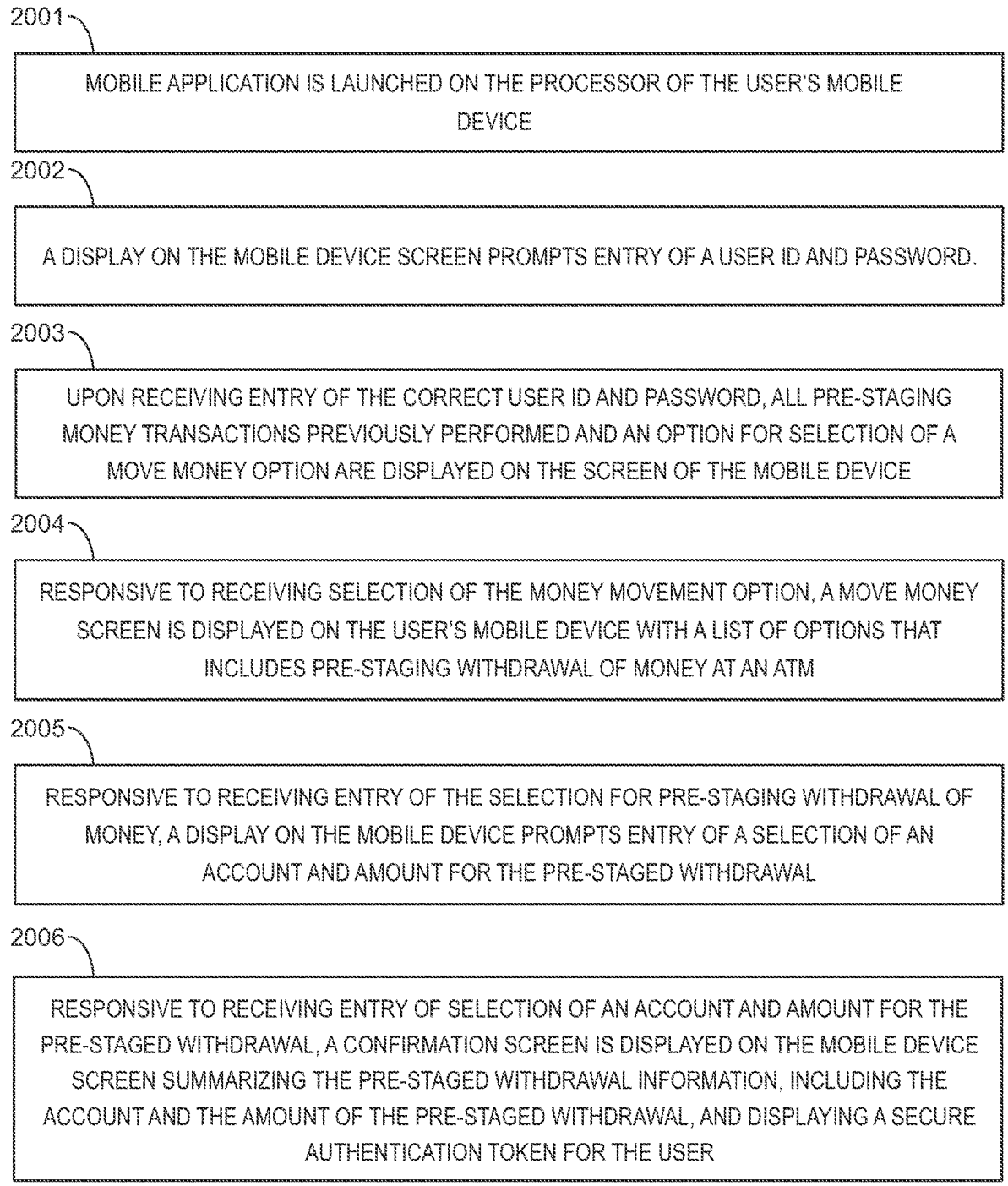
FIG. 2 is a flow chart that illustrates an overview example of a process of pre-staging an ATM transaction for embodiments of the invention.

FIG. 2 is a flow chart that illustrates an overview example of a process of pre-staging an ATM transaction, such as a cash withdrawal for embodiments of the invention. Referring to FIG. 2 at 2001, when the mobile application 102 for embodiments of the invention is launched on the processor of the user's mobile device 100, the user may be prompted, at 2002, by a display on the mobile device screen for entry of a user ID and password. At 2003, upon receiving entry of the correct user ID and password, all transactions that the user has previously performed in terms of pre-staging money transactions, such as withdrawal transactions using the pre-staging function for embodiments of the invention, may be displayed on the screen of the user's device 100. In addition, various options may also be displayed on the user's device 100, such as an option to move money.

Referring again to FIG. 2, at 2004, responsive to receiving selection of the money movement option, a move money screen may be displayed on the user's mobile device 100 with a list of selections that includes a selection for pre-staging withdrawal of money at an ATM 106. At 2005, in response to receiving entry of the selection for pre-staging withdrawal of money, the user may be prompted by a display on the mobile device 100 for entry of a selection of an account, such as a checking or savings account, of the user for the withdrawal, and a selection of an amount to be withdrawn from the account.

Referring further to FIG. 2, at 2006, responsive to receiving entry of selection of an account and an amount to be withdrawn from the account, a confirmation screen may displayed on the user's mobile device 100 summarizing the pre-staged withdrawal information including, for example, the account from which the withdrawal will be made and the amount of the pre-staged withdrawal. The confirmation screen may also display an authentication token for the user, generated and sent by the host processor 112 via the secure gateway 114 to the user's mobile device 100, which must be entered by the user at the ATM 106 along with the user's PIN in order to execute the pre-staged withdrawal of cash. The authentication token may comprise, for example, one or more characters, such as digits, letters, or symbols, or any combination of such characters.

Figure 3:
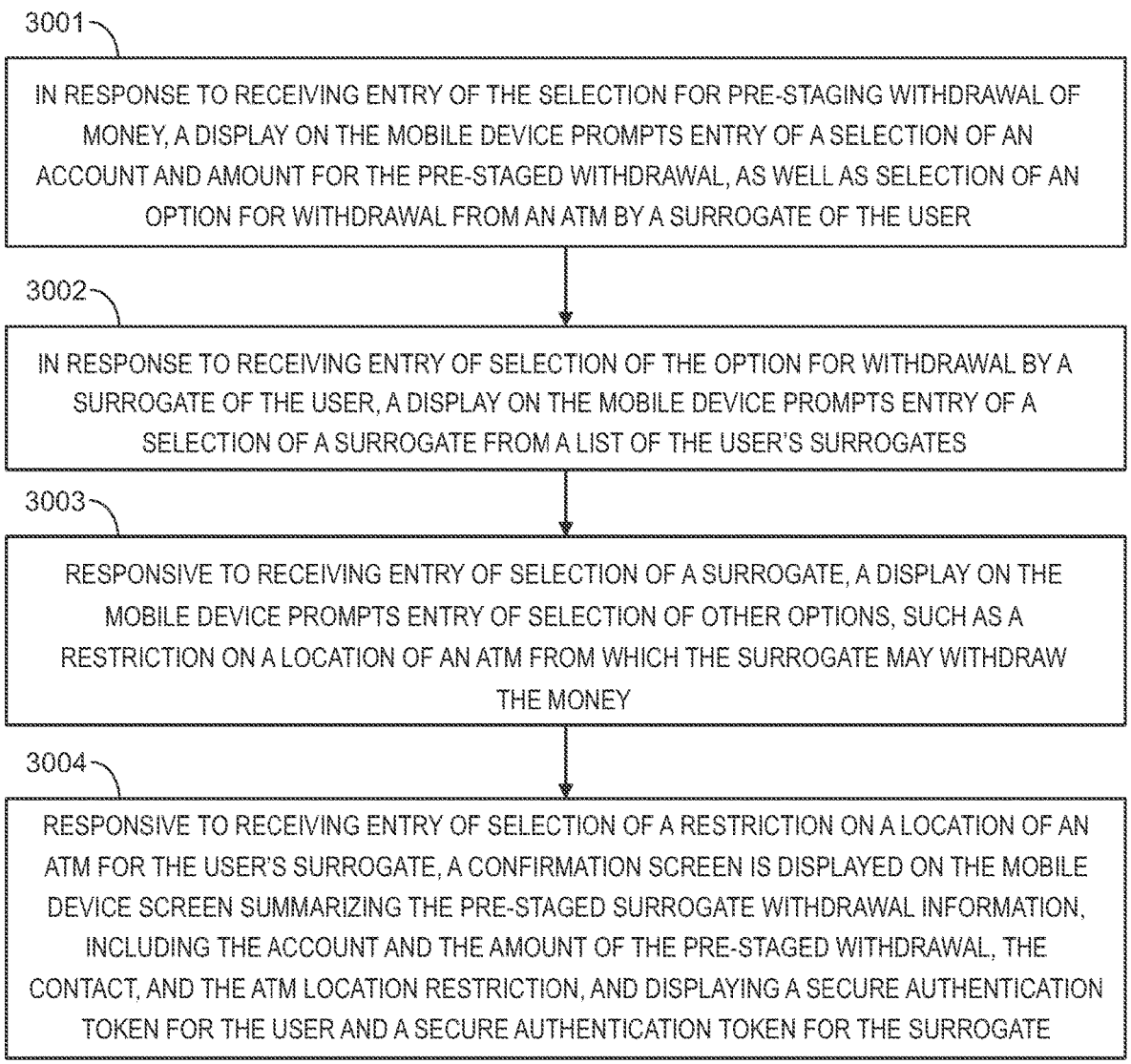
FIG. 3 is a flow chart that illustrates an overview example of a process of pre-staging an ATM transaction for a surrogate for other embodiments of the invention.

FIG. 3 is a flow chart that illustrates an overview example of a process of pre-staging an ATM transaction, such as a cash withdrawal by a surrogate for other embodiments of the invention. Referring to FIG. 3, similar to the example process illustrated in FIG. 2, at 3001 in FIG. 2, responsive to receiving entry of the selection for the pre-staged withdrawal of money option, the user may be prompted by the display on the mobile device 100 for entry of a selection of an account and amount for the pre-staged withdrawal. In addition the user may be prompted by the display on the mobile device 100 for entry of a selection of an option for withdrawal by a surrogate of the user.

Referring further to FIG. 3, at 3002, in response to receiving the user's selection of the option for withdrawal by the user's surrogate, the user may be prompted for selection of a surrogate from a list of the user's surrogates displayed on the user's mobile device 100. Thereafter, at 3003, responsive to receiving the user's selection of the option for withdrawal by the user's surrogate, the user may be prompted for selection of other options, such as a location of an ATM from which the user's surrogate may withdraw the money. For example, if a user in Dallas wishes to pre-stage a withdrawal by a surrogate in New York, the user's entry of a restriction based on the surrogate's location may by received, for example, by entering a zip code for New York, such as 10128.

Referring again to FIG. 3, at 3004, a confirmation screen may be displayed on the user's mobile device screen summarizing the pre-staged surrogate withdrawal information including, for example, the account from which the withdrawal will be made, the amount of the pre-staged withdrawal, the identity of the surrogate, and the zip code of the geographic area in which an ATM may be used by the surrogate for the withdrawal. The confirmation screen may also display an authentication token for the user's surrogate, generated by and sent by the host processor 112 via the secure gateway 114 to the user's mobile device 100, which must be entered by the surrogate at the ATM 106. In addition, the confirmation screen may display an authentication token for the user likewise generated and sent by the host processor 112 via the secure gateway 114 to the user's mobile device 100, which must be entered, for example, on the user's mobile device 100 and sent to the host server processor 112 with the user's confirmation message in response to a confirmation request from the host server processor for the withdrawal. As noted, the authentication tokens may comprise, for example, one or more characters, such as digits, letters, or symbols, or any combination of such characters.

FIGS. 4A and 4B show a flow chart that illustrates an example of a process of performing a pre-staged user ATM transaction, such as a cash withdrawal for embodiments of the invention. Referring to FIG. 4A, at 4001, the user's entry of information for a pre-staged ATM user withdrawal, together with the user's ID and password, may be received by the processor of the user's mobile device 100 and sent by the user's mobile device processor via the secure gateway 114 to the host or backend server processor 112. At 4002, responsive to receiving the information for the pre-staged user's ATM withdrawal, together with the user's ID and password, the host or backend server processor 112 may validate the withdrawal information and the user's ID and password and generate and send an authentication token for the user to the user's mobile device 100 via the secure gateway 114 which may be displayed on the user's device screen for the user. Alternatively, the host or backend processor 112 may send an out-of band authentication token for the user to the user's registered mobile device 100 as an SMS, email, voicemail, or push notification message via an alerts platform 116, which may be displayed on the user's registered mobile device screen for the user.

Referring further the FIG. 4A, at 4003, the user may approach an ATM 106 and select an option for a pre-staged cash withdrawal displayed on the ATM. Alternatively, the user may scan or tap the user's NFC-enabled registered mobile device 100 on an NFC card reader panel or sensor of an ATM 106, and the NFC card reader may interface with the NFC chip on the user's mobile device 100. At 4004, in response to receiving the user's selection of an option for a pre-staged cash withdrawal, or alternatively in response to interfacing with the NFC chip on the user's mobile device, the processor of the ATM 106 may prompt the user for entry of the user's PIN and the user's authentication token on the ATM display screen.

Referring to FIG. 4B, at 4005, responsive to receiving entry of the user's PIN and the user's authentication token, the processor of the ATM 106 may send the user's ATM withdrawal request, together with the user's PIN and the user's authentication token to the host or back-end server processor 112. At 4006, upon validating the user's PIN and authentication token, the host or backend server processor 112 may debit the user's designated account for the amount of cash requested to be withdrawn, and an authorization message may sent to the ATM 106. At 4007, upon receiving the authorization message, the requested amount of cash may be dispensed by the ATM processor 106 for the user FIGS. 5A, 5B, and 5C show a flow chart that illustrates an example of a process of performing a pre-staged ATM transaction, such as a cash withdrawal by a user's surrogate for embodiments of the invention. Referring to FIG. 5A, at 5001, the user's entry of information for a pre-staged user's surrogate ATM withdrawal, together with the user's ID and password, may be received by the user's mobile device processor 100 and sent by the user's mobile device processor via the secure gateway 114 to the host or backend server processor 112.

Referring further to FIG. 5A, at 5002, responsive to receiving the information for the pre-staged user's surrogate ATM withdrawal, together with the user's ID and password, the host or backend server processor 112 may validate the withdrawal information and the user's ID and password and generate and send authentication tokens for the user and the user's surrogate to the user's mobile device 100 via the secure gateway 114, which may be displayed on the user's device screen for the user. Alternatively, the host or backend processor 112 may send out-of band authentication tokens for the user and the user's surrogate to the user's registered mobile device 100 as an SMS, email, voicemail, or push notification message via an alerts platform 116, which may be displayed on the user's registered mobile device screen for the user.

Referring to FIG. 5B, at 5003, the user may notify the user's surrogate, for example, via the surrogate's mobile device or via any other means of communication about the user's the pre-staged surrogate ATM withdrawal and the authentication token required to complete the transaction. At 5004, in response to entry by the surrogate of the surrogate's authentication token provided by the user, the processor of the ATM 106 may send the surrogate's authentication token via the ATM network 110 to the host or back-end server processor 112. At 5005, upon validating the surrogate's authentication token, the host or backend processor 112 may generate and send a request for confirmation via the alerts platform 116, for example, as an SMS, email, voicemail, or push notification, or voicemail message, to the user's mobile device processor 100, which may be displayed on the user's device screen for the user.

Referring to FIG. 5C, at 5006, responsive to receiving entry of the user's authentication token and confirmation, the user's registered mobile device processor 100 may send the user's authentication token and confirmation to the host or backend server processor 112, which may retrieve the previously received and validated pre-staged user's surrogate ATM withdrawal information, for example, from a mobile application database 118. The user's account may then be debited for the amount of cash requested to be withdrawn by the surrogate, and an authorization message may be sent to the ATM 106. At 5007, upon receiving the authorization message by the processor of the ATM 106, the requested amount of cash may be dispensed by the ATM processor 106 to the surrogate.

Figure 6:
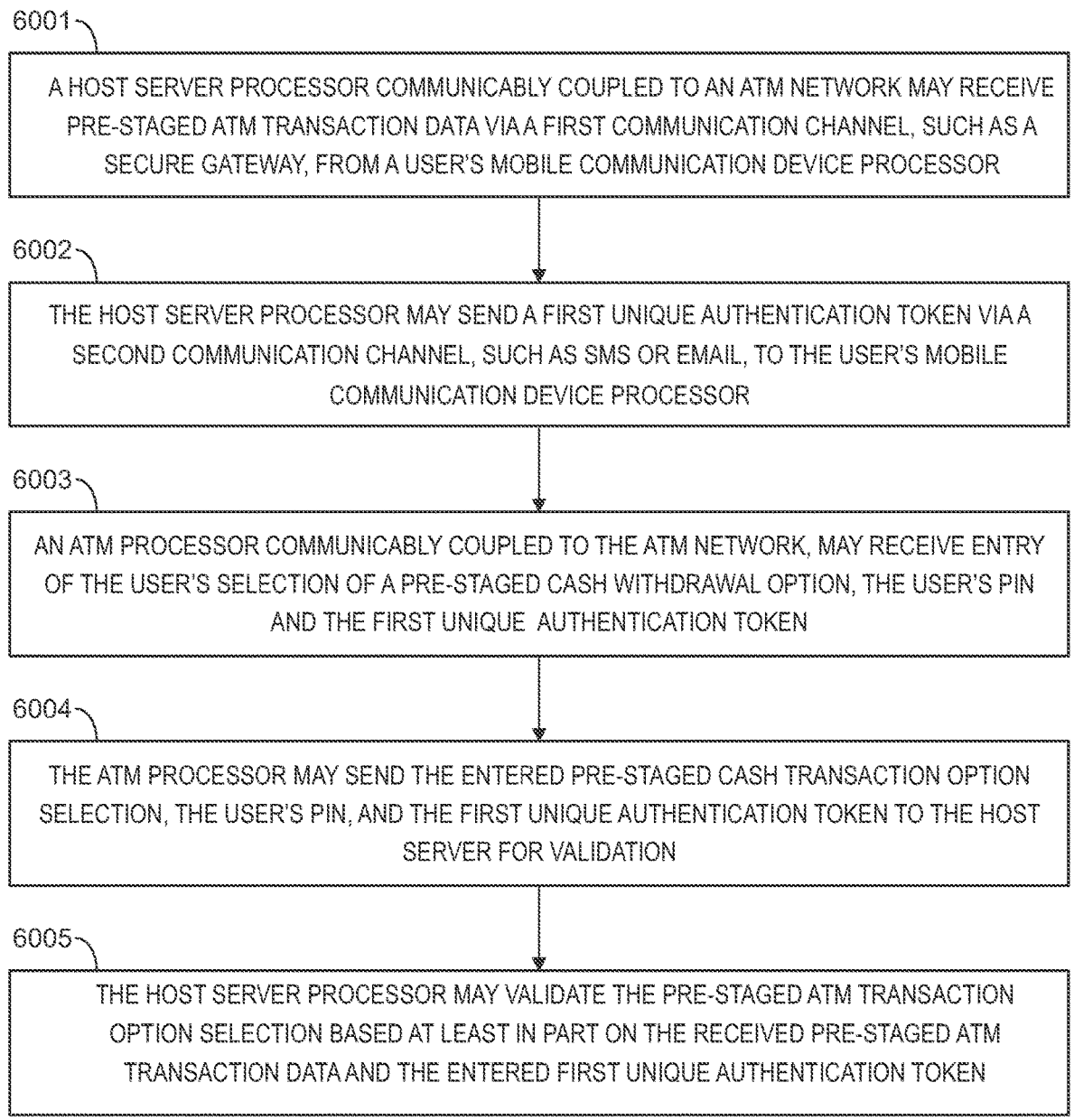
FIG. 6 is a flow chart that illustrates another example of a process of performing a pre-staged user ATM transaction for embodiments of the invention.

FIG. 6 is a flow chart that illustrates another example of a process of performing a pre-staged user ATM transaction, such as a cash withdrawal for embodiments of the invention. Referring to FIG. 6, at 6001, a host server processor 112 communicably coupled to an ATM network 110 may receive pre-staged ATM transaction data via a first communication channel 114, such as a secure gateway, from a user's mobile communication device processor 100. At 6002, the host server processor 112 may send a first unique authentication token via a second communication channel 116, such as SMS, email, voicemail, or push notification, to the user's mobile communication device processor 100.

Referring further to FIG. 6, at 6003, an ATM processor 106 communicably coupled to the ATM network 110 may receive entry of the user's selection of a pre-staged transaction, such as a cash withdrawal option, the user's PIN and the first unique authentication token. At 6004, the ATM processor 106 may send the entered pre-staged transaction option selection, the user's PIN, and the first unique authentication token to the host server 112 for validation. At 6005, the host server processor 112 may validate the pre-staged ATM transaction option selection based at least in part on the received pre-staged ATM transaction data and the entered first unique authentication token.

Figure 7:
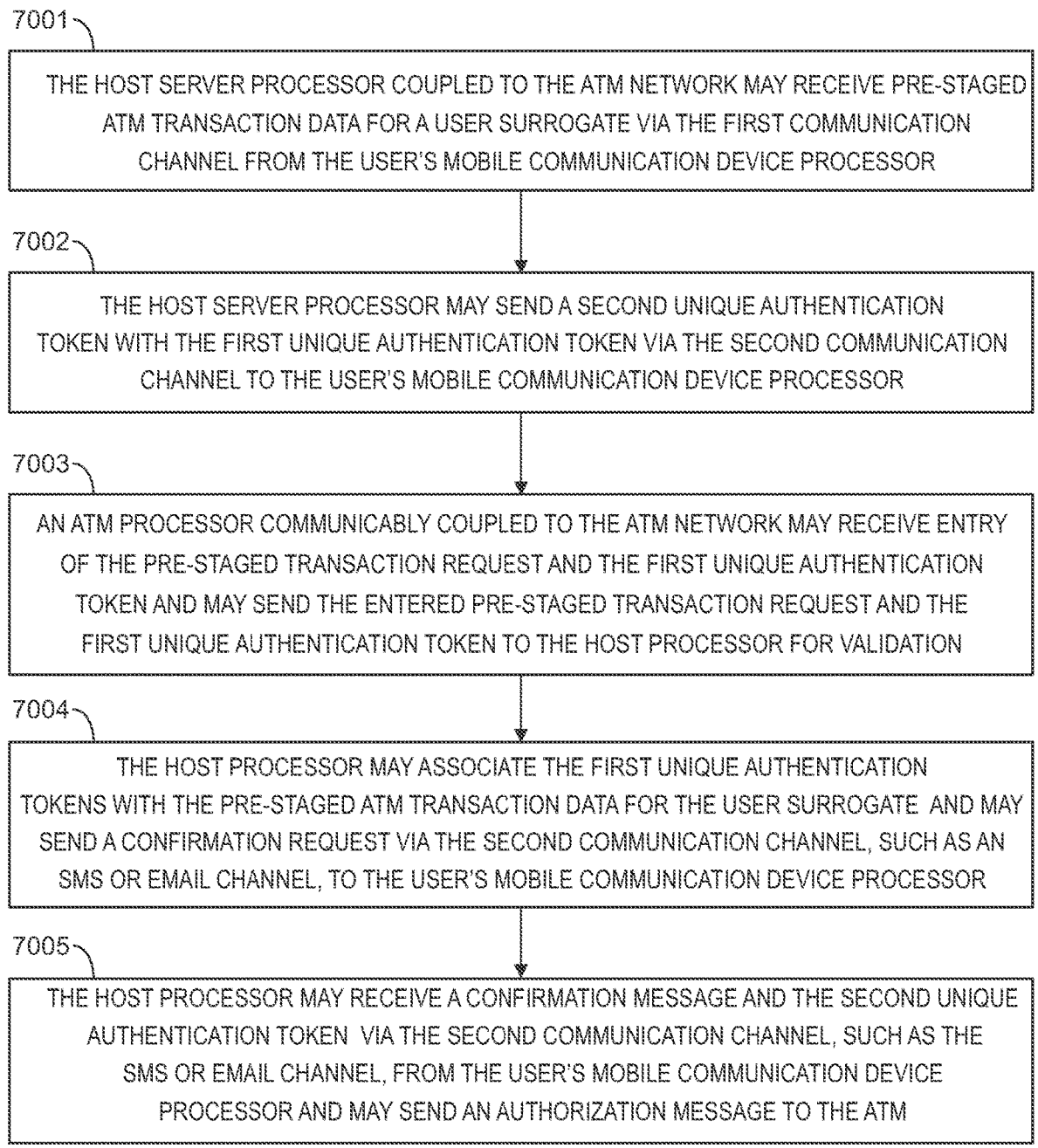
FIG. 7 is a flow chart that illustrates another example of a process of performing a pre-staged ATM transaction by a user's surrogate for embodiments of the invention.

FIG. 7 is a flow chart that illustrates an example of a process of performing a pre-staged ATM transaction, such as a cash withdrawal by a user's surrogate for embodiments of the invention. Referring to FIG. 7, at 7001, a host server processor 112 communicably coupled to an ATM network 110 may receive pre-staged ATM transaction information for a user surrogate via a first communication channel 114, such as a secure gateway, from a user's mobile communication device processor 100. Referring further to FIG. 7, at 7002, the host server processor 112 may send a second unique authentication token with the first unique authentication token via a second communication channel 116, such as SMS, email, voicemail, or push notification to the user's mobile communication device processor 100. As previously noted, it is to be understood that all references herein to "second unique authentication token" or "second authentication token" are deemed to include any second and/or additional active and/or passive authentication mechanism or mechanisms.

Referring again to FIG. 7, at 7003, an ATM processor 106 communicably coupled to the ATM network 110 may receive entry by the user surrogate of the pre-staged ATM transaction request and the first unique authentication token and may send the entered pre-staged ATM transaction request and said first unique authentication token to the host processor 112 for validation. At 7004, the host processor 112 may associate the first unique authentication token with the pre-staged ATM transaction data for the user surrogate retrieved, for example, from the application database 118 and may send a confirmation request via the second communication channel, such as an SMS, email, voicemail, or push notification channel, to the user's mobile communication device processor 100. At 7005, the host processor 112 may receive a confirmation message and the second unique authentication token via the second communication channel, such as the SMS, email, voicemail, or push notification channel, from the user's mobile communication device processor 100 and may send an authorization message to the ATM 106 responsive to receiving the confirmation message and second authentication token.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C #, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices

What is claimed is:

1. A system, comprising:
a host server processor communicably coupled to an ATM network and also communicably coupled to a secured mobile gateway, the host server processor being programmed to:
receive, from a user's mobile communication device processor communicably coupled to the secured mobile gateway, pre-staged ATM transaction data for a transaction by a surrogate of the user, via a first communication channel comprising the secured mobile gateway, the transaction data comprising a geographic limitation for an ATM at which the transaction may occur;

send a first unique authentication token for the user for the transaction by the surrogate of the user and a second unique transaction token for the surrogate of the user for the transaction by the surrogate of the user, via a second communication channel separate from the first communication channel, to the user's mobile communication device processor;

the user's mobile communication device processor being programmed to:

register a unique identifier associated with the user's mobile communication device processor with the host server processor;

send, to a computing device processor of the surrogate of the user, a notification of the transaction by the surrogate of the user; and send, to a computing device processor of the surrogate of the user, the second unique authentication token for the surrogate of the user for the transaction by the surrogate of the user;

the computing device processor of the surrogate of the user being programmed to receive, from user's mobile communication device processor, the second unique authentication token;

the ATM processor communicably coupled to the ATM network and programmed to:

receive entry by the surrogate of the user of a pre-staged ATM transaction request for the transaction by the surrogate of the user and the second unique authentication token for the surrogate of the user for the transaction by the surrogate of the user;

send the entered pre-staged ATM transaction request for the transaction by the surrogate of the user and second unique authentication token for the surrogate of the user for the transaction by the surrogate of the user to the host server for validation; and the host server processor being further programmed to:

validate the pre-staged ATM transaction request for the transaction by the surrogate of the user based at least in part on the received pre-staged ATM transaction data for the transaction by the surrogate of the user and the entered second unique authentication token for the surrogate of the user for the transaction by the surrogate of the user;

send a request for a confirmation by the user via a push notification to the user's mobile communication device processor after receiving the entered second unique authentication token from the surrogate of the user;

receive the user's entry of the first unique authentication token for the user for the transaction by the surrogate of the user;

receive the unique identifier of the user's mobile communication device processor;

verify that the unique identifier of the user's mobile communication device processor matches the registered unique identifier;

receive a confirmation response from the user's mobile communication device processor; and send an authorization message for the transaction by the surrogate of the user to the ATM processor.

2. The system of claim 1, the host server processor being further programmed to receive the pre-staged ATM transaction data for the transaction by the surrogate of the user consisting at least in part of a withdrawal amount and account and a user ID and password via the first communication channel from the user's mobile communication device processor.

3. The system of claim 1, the host server processor being further programmed to receive the pre-staged ATM transaction data for the transaction by the surrogate of the user consisting at least in part of a withdrawal location via the first communication channel from the user's mobile communication device processor.

4. The system of claim 1, the host server processor being further programmed to receive the pre-staged ATM transaction data for the transaction by the surrogate of the user via the first communication channel comprising the secured mobile gateway from the user's mobile communication device processor.

5. The system of claim 1, the host server processor being further programmed to send the second unique authentication token for the transaction by the surrogate of the user via a second communication channel comprising an SMS, email, voicemail, or push notification channel to the user's mobile communication device processor.

6. The system of claim 1, the host server processor being further programmed to send the first unique authentication token for the transaction by the user together with the second unique authentication token for the transaction by the surrogate of the user via the second communication channel comprising an SMS, email, voicemail, or push notification channel to the user's mobile communication device processor.

7. The system of claim 1, the ATM processor being further programed to receive entry by the surrogate of the user of the pre-staged ATM transaction request for the transaction by the surrogate of the user via a contactless interface with the computing device processor of the surrogate of the user comprising a mobile communication device processor of the surrogate of the user and the second unique authentication token for the transaction by the surrogate of the user via entry on a touch screen interface of the first ATM processor.

8. The system of claim 1, the ATM processor being programed to receive the pre-staged ATM transaction request for the transaction by the surrogate of the user and the second unique authentication token for the transaction by the surrogate of the user within a user-defined time-out period.

9. A method, comprising;

receiving, by a host server processor communicably coupled to an ATM network and also communicably coupled to a secured mobile gateway, pre-staged ATM transaction data for a transaction by a surrogate of the user via a first communication channel comprising the secured mobile gateway from a user's mobile communication device processor;

sending, by the host server processor, a first unique authentication token for the user for the transaction by the surrogate of the user and a second unique transaction token for the surrogate of the user for the transaction by the surrogate of the user, via a second communication channel separate from the first communication channel, to the user's mobile communication device processor;

sending, by the user's mobile communication device processor and to a computing device processor of the surrogate of the user, a notification of the transaction by the surrogate of the user together with the second unique authentication token for the surrogate of the user for the transaction by the surrogate of the user;

receiving, by an ATM processor communicably coupled to the ATM network, entry by the surrogate of the user of a pre-staged ATM transaction request for the transaction by the surrogate of the user and the second unique authentication token for the surrogate of the user for the transaction by the surrogate of the user;

sending, by the ATM processor, the entered pre-staged ATM transaction request for the transaction by the surrogate of the user and the second unique authentication token for the surrogate of the user for the transaction by the surrogate of the user to the host server for validation; and validating, by the host server processor, the pre-staged ATM transaction request for the transaction by the surrogate of the user based at least in part on the received pre-staged ATM transaction data for the transaction by the surrogate of the user and the entered second unique authentication token for the surrogate of the user for the transaction by the surrogate of the user sending, by the host server processor after receiving the entered second unique authentication token from the surrogate of the user, a request for a confirmation by the user via an alerts platform to the user's mobile communication device processor;

receiving, by the host server processor, the user's entry of the first unique authentication token for the user for the transaction by the surrogate of the user and a confirmation response from the user's mobile communication device processor;

verifying, by the host server processor, that a unique identifier of the user's mobile communication device processor from which the first unique authentication token is received matches an identifier associated with the user and registered with the host server processor; and sending, by the host server processor, an authorization message for the transaction by the surrogate of the user to the ATM processor.

10. The method of claim 9, wherein receiving the pre-staged ATM transaction data for the transaction by the surrogate of the user via the first communication channel from the user's mobile communication device processor further comprises receiving, by the host server processor, the pre-staged ATM transaction data for the transaction by the surrogate of the user consisting at least in part of a withdrawal amount and account and a user ID and password via the first communication channel from the user's mobile communication device processor.

11. The method of claim 9, wherein receiving the pre-staged ATM transaction data for the transaction by the surrogate of the user via the first communication channel from the user's mobile communication device processor further comprises receiving, by the host server processor, the pre-staged ATM transaction data for the transaction by the surrogate of the user consisting at least in part of a withdrawal location via the first communication channel from the user's mobile communication device processor.

12. The method of claim 9, wherein said second communication channel comprises an SMS, email, voicemail, or push notification channel.

13. The system of claim 1, wherein the unique identifier is an International Mobile Subscriber Identity number.

* * * * *